United States Patent [19]
Bromba et al.

[11] Patent Number: 5,708,480
[45] Date of Patent: Jan. 13, 1998

[54] METHOD AND CIRCUIT CONFIGURATION FOR REDUCING FLICKER IN A TELEVISION SET

[75] Inventors: Manfred Bromba, München; Konrad Maul, Nürnberg, both of Germany

[73] Assignees: Siemens AG, Munich, Germany; Grundig E.M.V. Electro-Mechanische Versuchsanstalt, Max Grundig, Netherlands; Stiftung & Co, KG, Furth, Germany

[21] Appl. No.: 603,932

[22] Filed: Feb. 20, 1996

Related U.S. Application Data

[63] Continuation of PCT/EP94/02469, Jul. 26, 1994, published as WO95/05717, Feb. 23, 1995.

[51] Int. Cl.⁶ ............................................. H04N 5/21
[52] U.S. Cl. .......................... 348/620; 348/910; 348/447
[58] Field of Search ............................. 348/620, 910, 348/618, 619, 447; H04N 5/21

[56] References Cited

U.S. PATENT DOCUMENTS

| | | | |
|---|---|---|---|
| 4,272,787 | 6/1981 | Michael et al. | 348/447 |
| 4,539,594 | 9/1985 | Illetschko | 348/620 |
| 4,652,907 | 3/1987 | Fling | 348/620 |
| 4,661,853 | 4/1987 | Roeder et al. | |
| 5,032,905 | 7/1991 | Koga | |

FOREIGN PATENT DOCUMENTS

| | | |
|---|---|---|
| 0 210 861 | 2/1987 | European Pat. Off. |
| 0 220 946 | 5/1987 | European Pat. Off. |
| 0 333 069 | 9/1989 | European Pat. Off. |
| 0 339 365 | 11/1989 | European Pat. Off. |
| 0 370 500 | 5/1990 | European Pat. Off. |
| 0 391 760 | 10/1990 | European Pat. Off. |
| 0 419 315 | 3/1991 | European Pat. Off. |
| 0 457 393 | 11/1991 | European Pat. Off. |
| 0 566 412 | 10/1993 | European Pat. Off. |
| 43 27 733 | 6/1994 | Germany |
| 2 045 574 | 10/1980 | United Kingdom |
| 2 092 858 | 8/1982 | United Kingdom |

OTHER PUBLICATIONS

Publ. Fernseh–Und Kino–Technik 38, No. Jun. 1984, pp. 231–238, "Verbesserung der PAL–Bildqualitaet durch digitale Interframetechnik" (Improving PAL Picture Quality by a Digital Interframe Technique).

*Primary Examiner*—Victor R. Kostak
*Attorney, Agent, or Firm*—Herbert L. Lerner; Laurence A. Greenberg

[57] ABSTRACT

A method and a circuit configuration for flicker reduction in a television set include counting the number of partial areas of a field/frame which have been ascertained to be moving, through the use of a motion detector. When a threshold value is exceeded, a changeover is made from a field reproduction sequence with reduced flicker to a field reproduction sequence with reduced flicker and correct motion. The method can be practiced by using standard components.

9 Claims, 1 Drawing Sheet

METHOD AND CIRCUIT CONFIGURATION FOR REDUCING FLICKER IN A TELEVISION SET

CROSS-REFERENCE TO RELATED APPLICATION

This application is a continuation of International Application Serial No. PCT/EP94/02469, filed Jul. 26, 1994, published as WO95/05717, Feb. 23, 1995.

BACKGROUND OF THE INVENTION

Field of the Invention

The invention relates to a method for reducing flicker in a television set, in which motion of the contents of a frame to be processed is determined by a device for motion detection, a first frame reproduction sequence with reduced flicker is executed if no motion is detected, and a second frame reproduction sequence with reduced flicker and correct motion is executed if movement is detected.

The invention additionally relates to a circuit configuration for carrying out the method.

Television sets operate according to the line interlacing method. A frame is processed and presented in the form of two fields which are displayed one after the other in time and in a manner offset by one line. In that case, flicker is produced, on one hand in fine structures and, on the other hand in structures with large areas (edge flicker and large area flicker, respectively).

In order to reduce flicker, methods are therefore used in which the fields are additionally displayed once again in a time period that is predetermined at the transmitter end. A first such method includes displaying the fields (A, B) of a frame directly succeeding one another and thereupon repeating them once again (ABAB). The rate of display in that case is twice the conventional rate of display. In that method, the frequencies both of the large-area flicker and of the edge flicker are doubled, thereby producing a reduction in flicker due to the inertia of the human eye.

What is problematic is that the fields each belong to different motion phases. In the case of the field part-sequence BA, a jump back exists in the motion phase. Moving contents are therefore perceived as jittery motion. The quality afforded by the display method ABAB in the case of rapidly moving frame contents is, accordingly, inadequate.

In the case of a second method, each field is repeated directly (AABB). The field sequence in that case is correct in terms of the motion phases. A frame reproduction sequence with correct motion is thus possible. The frequency of the large-area flicker is doubled, whereas the frequency of the edge flicker remains unchanged.

Published European Patent Application 0 339 365 A2 discloses a method and a circuit configuration for flicker reduction in a television receiver, in the cases of which a vertical high-frequency and low-frequency signal is formed in each case for the fields A, B, according to the spatial frequency. The high-frequency signal is reproduced in the field reproduction sequence ABAB and the low-frequency signal is reproduced with an interpolating field reproduction sequence AABB. At high motion speeds, a changeover is made to the interpolating field reproduction sequence AABB without high-frequency/low-frequency signal division. Therefore, in that case, the motion speed is evaluated. The method is relatively complex to practice due to the required outlay for digital signal processing. An example thereof is the necessity of a complementary, vertical high-frequency signal filter.

A method for flicker reduction in television sets is described in a publication entitled: Verbesserung der PAL-Bildqualität durch digitale Interframetechnik [Improving PAL Picture Quality by a Digital Interframe Technique] by Helmut Schönfelder, in Fernseh- und Kino-technik [Television and Cinema Technology], Volume 38, 1984, No. 6, pages 231 to 238. That method uses a motion detector to determine the occurrence of moving structures and changes over from a field reproduction sequence ABAB for slightly moving structures to a reproduction sequence AABB for moving structures.

Published European Patent Application 0 210 861 A2 describes a motion detector which is used for motion correction when converting high-definition progressive frames to line-interlaced PAL frames. The direction and magnitude of a motion vector are determined for one frame by evaluating successive frames in a block-by-block manner. Those pixels which cannot be used to form the motion vector due to slight motion are counted in each block to be evaluated. When a predetermined threshold is exceeded, the motion vector element for the corresponding block is set to 0, thereby avoiding unreliable motion detection.

SUMMARY OF THE INVENTION

It is accordingly an object of the invention to provide a method and a circuit configuration for reducing flicker in a television set, which overcome the hereinafore-mentioned disadvantages of the heretofore-known methods and devices of this general type, which can be provided with little circuitry and which have a frame reproduction with adequate flicker reduction and correct motion as far as possible.

With the foregoing and other objects in view there is provided, in accordance with the invention, a method for reducing flicker in a television set, which comprises determining motion of contents of a frame to be processed with a device for motion detection, by detecting if motion of the contents of each of a multiplicity of parts of the frame to be processed exists with the device for motion detection, wherein the parts encompass a number of coherent pixels, and indicating a motion event for each part with a signal, by counting the motion events frame by frame with a counting device, comparing the number of motion events with a threshold value, carrying out a first frame reproduction sequence with reduced flicker if no motion is detected by executing the first frame reproduction sequence when the threshold value is undershot, and carrying out a second frame reproduction sequence with reduced flicker and correct motion if movement is detected by executing the second frame reproduction sequence when the threshold value is exceeded.

In accordance with another mode of the invention, there is provided a method which comprises executing the frame reproduction according to a line interlacing method by successively reproducing a first and a second field for one frame, by repeating the first and second fields of a frame after the first and second fields of the same frame in each case, for the first frame reproduction sequence, and by repeating the first field after the first field of the same frame and repeating the second field after the second field of the same frame, for the second frame reproduction sequence.

In accordance with a further mode of the invention, there is provided a method which comprises executing a changeover from the first frame reproduction sequence to the second frame reproduction sequence at a first threshold value, and executing a changeover from the second frame reproduction sequence to the first frame reproduction sequence at a second threshold value, for producing a hysteresis.

In accordance with an added mode of the invention, there is provided a method which comprises carrying out the motion detection both horizontally in a line direction and vertically over at least two lines.

With the objects of the invention in view, there is also provided a circuit configuration for reducing flicker in a television set, comprising a device for motion detection having an input for a video signal and an output for a signal indicating that motion can be detected for a multiplicity of parts of a frame to be processed, wherein the parts encompass a number of coherent pixels; a counting device having an input connected to the device for motion detection for changing a counter reading when a motion event occurs; a comparison device having an input connected to the counting device for comparing the counter reading of the counting device with a threshold value; and a control device being connected to the comparison device for changing over from a first frame reproduction sequence with reduced flicker to a second frame reproduction sequence with reduced flicker and correct motion.

In accordance with another feature of the invention, the threshold value of the comparison device is set as a function of the frame reproduction sequence being just set.

In accordance with a further feature of the invention, the counting device is reset in a manner coupled to the frame.

In accordance with an added feature of the invention, the motion detector detects horizontal and vertical motion.

In accordance with a concomitant feature of the invention, there is provided a device for access control being controlled by the control device, and at least two field memories each being connected to the device for access control.

The method can be practiced both as a software solution through the use of a microprocessor and in terms of hardware according to the circuit configuration. For instance, television sets normally contain a motion detector for executing noise reduction methods. The motion detector can also be used at the same time for the method and circuit configuration according to the invention. In comparison with the known configuration, the motion detector can have a less complex structure, since it detects only the presence of motion, but not the motion speed.

The signal control for the frame reproduction sequence with reduced flicker and correct motion can be executed by components which are already present. Accordingly, the method and circuit configuration according to the invention can be constructed by using standard components.

Other features which are considered as characteristic for the invention are set forth in the appended claims.

Although the invention is illustrated and described herein as embodied in a method and a circuit configuration for reducing flicker in a television set, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
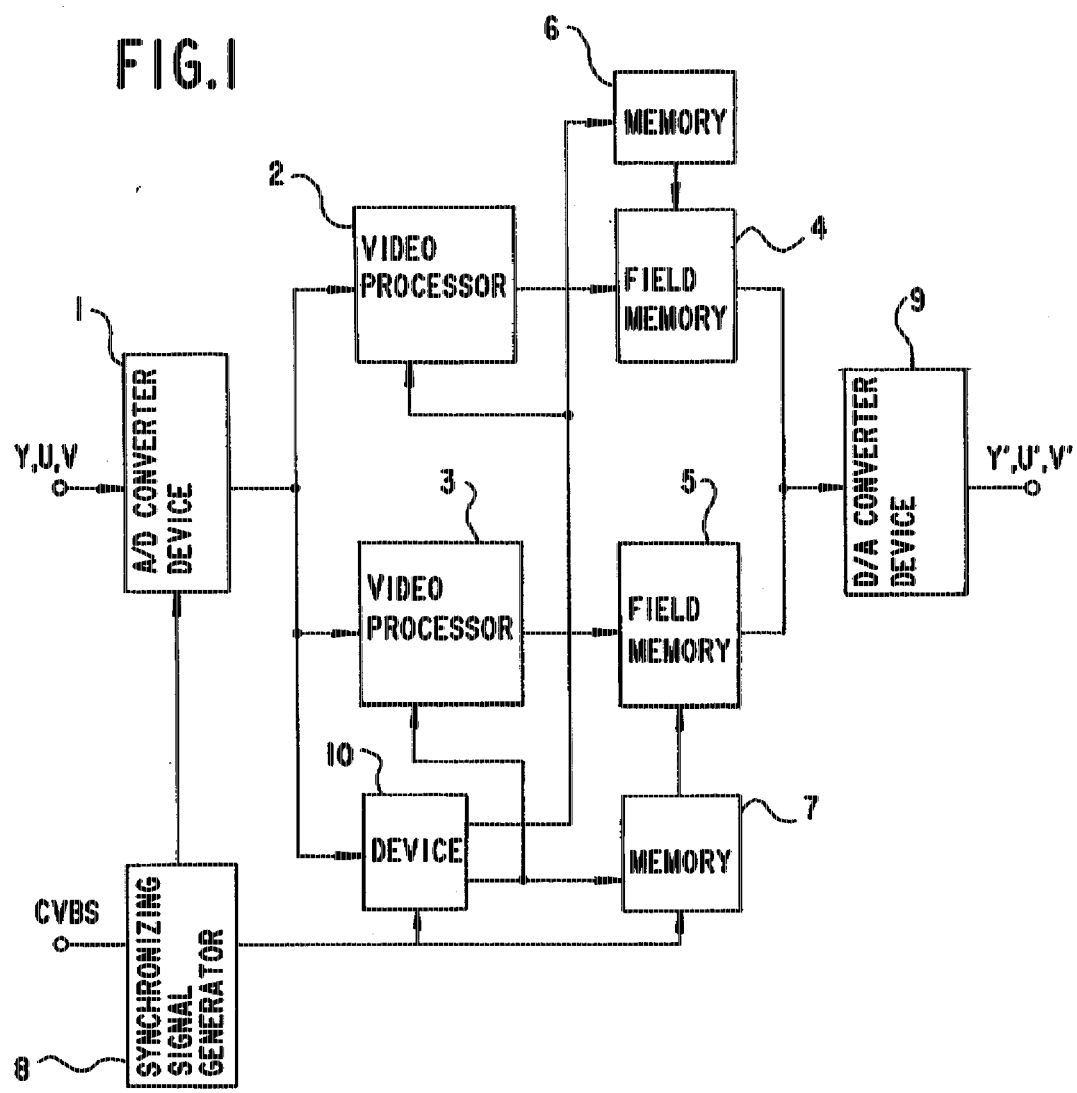
FIG. 1 is a block diagram of a circuit for video signal processing.

Referring now to the figures of the drawing in detail and first, particularly, to FIG. 1 thereof, it is seen that a color-coded video signal having a luminance component Y and a chrominance components U, V is fed to a video signal processing stage of a television set. This color-coded video signal is produced, for example, by a color decoder in the television set from a baseband video signal CVBS. The baseband video signal can in turn be obtained from an antenna signal through the use of a tuner and an intermediate frequency and demodulation stage. The video signal components of the color-coded video signal Y, U, V are digitally converted in an analog/digital converter device 1. One respective video processor 2, 3 provides for the conditioning of each field. Usual functions are, for example, noise reduction, picture format adaptation and conversion, and the production of effects such as picture-in-picture or the insertion of information (on-screen display). The information of a respective field is present at an output of the video processors 2, 3. The fields are buffered with their luminance and chrominance information in a respective field memory 4 and 5. Control signals for reading to and from the field memories 4, at the right time are provided by a respective memory or access control device 6 and 7. In the case of frame-synchronous coupling of the control devices 6, 7, a synchronizing signal generator 8 is provided which separates synchronizing signal components from the analog video signal CVBS and conditions them with correct timing for further processing in the converter device 1 and the control devices 6, 7. The field memories 4, 5 are connected on the output side to a digital/analog converter device 9, which forwards video signal components Y', U', V40 that have been conditioned to a video output stage of the television set. The video output stage generates signals therefrom which can be used to drive a picture tube.

According to the invention, a device 10 is provided which effects a changeover of the field reproduction sequence as a function of the motion of the picture contents. The device 10 is supplied with the video signals, which have been digitally converted by the converter 1, as well as line-coupled and frame-coupled synchronization information from the synchronizing signal generation device 8. The device 10 generates control signals for the memory controllers 6, 7 and the video processors 2, 3.

When the device 10 detects sufficient motion of the picture contents, a changeover is made from a first field reproduction sequence with reduced flicker to a second field reproduction sequence with reduced flicker and correct motion. A reproduction sequence ABAB is provided as the first field reproduction sequence, with one frame being formed of two fields A, B. As mentioned at the beginning, edge flicker and large-area flicker are effectively reduced by the sequence ABAB. A second field reproduction sequence AABB is used for intensive-motion picture contents. This reproduction sequence is distinguished by the fact that the representation is correct in terms of motion, since the field sequence corresponds to the natural motion phase. Large-area flicker is reduced by the sequence AABB, whereas edge flicker remains unaffected. The time taken to reproduce one field is 10 ms, with the result that 40 ms are required for each frame. The reproduction frequency for each field is consequently 100 Hz. While the field A contains, for example, the odd-numbered lines, the field B contains the even-numbered lines. Accordingly, the fields A, B are displayed with offset lines at the corresponding positions a and b on a screen. The changeover takes place with frame synchronization.

Figure 2:
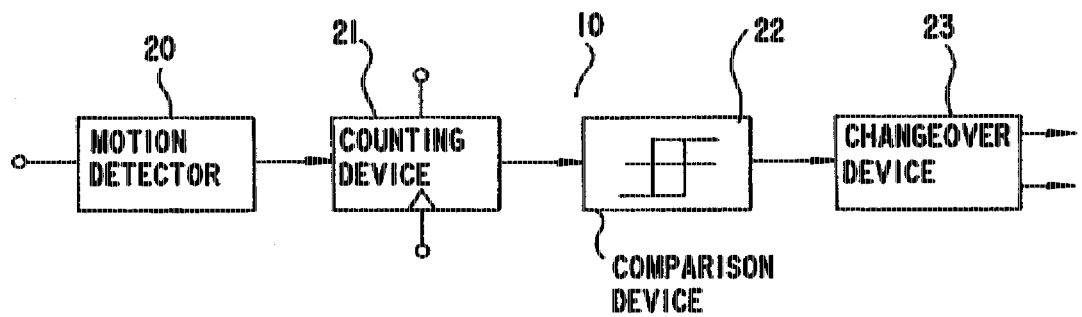
FIG. 2 is a block circuit diagram of a motion-dependent changeover control of the video signal processing.

The decision regarding which of the field reproduction sequences is used for the picture representation in the television set is made by the device 10. In detail, according to FIG. 2, the device 10 contains a motion detector 20 supplying an output signal which indicates whether or not motion occurs in a specific picture area. The number of motion events is counted in a counting device 21, with block-by-block evaluation taking place, for example. The counting result is evaluated with coupling to the frame. For this purpose, the counting operation is reset, for example, field by field or frame by frame or for a sequence of fields and/or frames. The corresponding reset signal and the counter clock are derived from the frame-synchronous control signals of the synchronizing signal generation device 8. The reading of the counter 21 is compared with a threshold value in a comparison device 22. Depending on this threshold value, a changeover then takes place in a control device 23 from the field reproduction sequence ABAB to AABB, and vice versa. Outputs of the changeover device 23 then carry trigger signals for the memory control devices 6, 7, through the use of which the fields stored in the field memories 4, 5 are read out in a controlled manner with correct timing according to the set field reproduction sequence. In order to achieve inertia in the changeover, for example with respect to noisy picture contents, the comparison device 22 has a hysteresis. This means that a changeover from the sequence ABAB to AABB takes place at a first threshold and a changeover in the opposite direction takes place at a second threshold. If a counting-up counter is used for the counting device 21, the first threshold is higher than the second.

Known motion detectors can be used for the motion detector 20. For example, a motion detector evaluates the motion of the contents of part of a field or frame with respect to a number of adjacent pixels. For this purpose, the brightness difference between the same pixels of chronologically succeeding fields or frames can be evaluated. In addition, the motion speed could also be taken into account by determining the displacement of the same picture contents between chronologically succeeding fields or frames.

When threshold values for the change in brightness or the displacement magnitude are exceeded, a motion event is ascertained for the pixel area under consideration and is indicated at the output of the motion detector 20. The pixel area which is to be evaluated and has a number of coherent pixels may take the form of a section of a line, that is to say evaluation in the horizontal direction, as well as the corresponding area of adjacent lines, that is to say evaluation in the vertical direction. This evaluation is carried out in the motion detector for a multiplicity of sections of a field or frame which have been defined in this way. The number of motion events being counted by the counting device 21, for example for each field, represents a measure of the motion of the picture contents.

The decision threshold values of the comparison device 22 for changing over between the reproduction sequence ABAB and AABB and vice versa are to be selected in a manner which is adapted to the human eye, with the result that the picture rendition on the screen of the television set is one with the flicker being subjectively reduced as far as possible, and nevertheless with correct motion. This threshold can be permanently set by the manufacturer. A variable definition of the threshold values is also conceivable, for example under the control of a microprocessor, with it being additionally possible to effect adaptation to noise properties of the video signal and to other properties of the video signal source.

The device 10 can be provided partly or completely, and in particular in the case of the devices 21, 22, 23, through the use of the software control of a microprocessor. A microprocessor is usually present anyway for controlling the signal processing in the set. Dedicated hardware solutions are already known for the motion detector 20. A motion detector is provided, for example, in the SDA 9290 component from Siemens together with one of the video processing devices 2, 3, as an integrated circuit.

The output signal of the motion detector can then be used simultaneously both for controlling the video signal processing in the devices 2, 3 and for controlling the changeover of the field reproduction sequence in the device 10. A circuit configuration according to the invention can thus be constructed by using commercially available components, that is to say without constructing further complex integrated circuits. Integrated circuits also already exist for other functional blocks shown in FIG. 1. These are, in detail, the SDA 9205-2 module for the device 1, the SDA 9257 module for the device 8, the SDA 9220 module for the devices 6, 7 and the SDA 9280 module for the device 9, all from the manufacturer mentioned above.

In a practical implementation according to the invention, a field comparison for determining motion is carried out, for example, by using the motion detector of the SDA 9290 and appropriate evaluation logic means. The result has only two logic states (motion "0", for example; no/slight motion "1", for example). This signal is presented to a control computer (microprocessor, microcontroller) of a digital television set at an I/O port. In order to make it possible to change over from the AABB mode (motion) to the ABAB mode (no/slight motion) without any disturbances, a changeover of a deflection raster ($\alpha\alpha\beta\beta$ $\alpha\beta\alpha\beta$) takes place with frame synchronization. This is achieved by virtue of the fact that a frame synchronization pulse is furthermore presented to the control computer at an I/O port. The changeover of the display and deflection mode of the digital deflection process can then be carried out with frame synchronization by the control computer through the I²C bus. The provision of a temporal hysteresis for the transition from AABB to ABAB is advantageous in this case.

We claim:
1. A method for reducing flicker in a television set, which comprises:

determining motion of contents of a frame to be processed with a device for motion detection, by detecting if motion of the contents of each of a multiplicity of parts of the frame to be processed exists with the device for motion detection, wherein the parts encompass a number of coherent pixels, and indicating a motion event for each part with a signal, by counting the motion events frame by frame with a counting device, comparing the number of motion events with a threshold value, carrying out a first frame reproduction sequence with reduced flicker if no motion is detected by executing the first frame reproduction sequence when the threshold value is undershot, and carrying out a second frame reproduction sequence with reduced flicker and correct motion if movement is detected by executing the second frame reproduction sequence when the threshold value is exceeded.

2. The method according to claim 1, which comprises:

executing the frame reproduction according to a line interlacing method by successively reproducing a first and a second field for one frame, by repeating the first and second fields of a frame after the first and second fields of the same frame in each case, for the first frame reproduction sequence, and by repeating the first field after the first field of the same frame and repeating the second field after the second field of the same frame, for the second frame reproduction sequence.

3. A method for reducing flicker in a television set, which comprises:

determining motion of contents of a frame to be processed with a device for motion detection, by detecting if motion of the contents of each of a multiplicity of parts of the frame to be processed exists with the device for motion detection, wherein the parts encompass a number of coherent pixels;

indicating a motion event for each part with a signal, by counting the motion events frame by frame with a counting device, comparing the number of motion events with a threshold value, carrying out a first frame reproduction sequence with reduced flicker if no motion is detected by executing the first frame reproduction sequence when the threshold value is undershot, and carrying out a second frame reproduction sequence with reduced flicker and correct motion if movement is detected by executing the second frame reproduction sequence when the threshold value is exceeded; and executing a changeover from the first frame reproduction sequence (ABAB) to the second frame reproduction sequence (AABB) at a first threshold value, and executing a changeover from the second frame reproduction sequence (AABB) to the first frame reproduction sequence (ABAB) at a second threshold value, for producing a hysteresis.

4. The method according to claim 1, which comprises carrying out the motion detection both horizontally in a line direction and vertically over at least two lines.

5. A circuit configuration for reducing flicker in a television set, comprising:

a device for motion detection having an input for a video signal and an output for a signal indicating that motion can be detected for a multiplicity of parts of a frame to be processed, wherein the parts encompass a number of coherent pixels;

a counting device having an input connected to said device for motion detection for changing a counter reading when a motion event occurs;

a comparison device having an input connected to said counting device for comparing the counter reading of said counting device with a threshold value; and a control device being connected to said comparison device for changing over from a first frame reproduction sequence with reduced flicker to a second frame reproduction sequence with reduced flicker and correct motion.

6. The circuit configuration according to claim 5, wherein the threshold value of said comparison device is set as a function of the frame reproduction sequence being just set.

7. The circuit configuration according to claim 5, wherein said counting device is reset in a manner coupled to the frame.

8. The circuit configuration according to claim 5, wherein said motion detector detects horizontal and vertical motion.

9. The circuit configuration according to claim 5, including a device for access control being controlled by said control device, and at least two field memories each being connected to said device for access control.

* * * * *

UNITED STATES PATENT AND TRADEMARK OFFICE
CERTIFICATE OF CORRECTION

PATENT NO. : 5,708,480
DATED : January 13, 1998
INVENTOR(S) : Manfred Bromba et al.

It is certified that error appears in the above-indentified patent and that said Letters Patent is hereby corrected as shown below:

Item [73] should read as follows:

Assignees:

Siemens AG, Munich; Germany;

Grundig E.M.V. Electro-Mechanische Versuchsanstalt

Max Grundig Holland Stiftung & Co. KG, Fürth, Germany

Signed and Sealed this

Eleventh Day of August 1998

*Attest:*

BRUCE LEHMAN

*Attesting Officer*    *Commissioner of Patents and Trademarks*